United States Patent [19]

Suzuki

[11] Patent Number: 5,447,427
[45] Date of Patent: Sep. 5, 1995

[54] BURNER AND METHOD FOR BURNING LOW CALORIFIC GAS

[75] Inventor: Tomio Suzuki, Kobe, Japan

[73] Assignee: Kabushiki Kaisha Kobe Seiko Sho, Kobe, Japan

[21] Appl. No.: 203,765

[22] Filed: Mar. 1, 1994

Related U.S. Application Data

[63] Continuation of Ser. No. 946,585, Sep. 18, 1992, abandoned.

[30] Foreign Application Priority Data

Sep. 24, 1991 [JP] Japan .................. 3-243512

[51] Int. Cl.6 .................................. F23D 14/16
[52] U.S. Cl. .................................. 431/7; 431/9; 431/328; 431/350
[58] Field of Search .......... 431/5, 7, 9, 159, 170, 431/202, 326, 328, 350, 354

[56] References Cited

U.S. PATENT DOCUMENTS

| | | | |
|---|---|---|---|
| 1,758,790 | 3/1930 | Fisher et al. | 431/179 |
| 2,087,031 | 7/1937 | Hays | 431/328 X |
| 3,407,024 | 10/1968 | Hirschberg et al. | 431/328 |
| 3,782,887 | 1/1974 | Brown | 431/353 |
| 3,914,089 | 10/1975 | Desty et al. | 431/328 X |
| 4,285,665 | 8/1981 | Eniga | 431/328 |
| 4,494,923 | 1/1985 | Guillaume et al. | 431/9 |
| 4,919,609 | 4/1990 | Sarkisian et al. | 431/7 |
| 4,991,396 | 2/1991 | Goerlich et al. | 431/5 X |
| 5,090,899 | 2/1992 | Kee | 431/326 |

FOREIGN PATENT DOCUMENTS

| | | | |
|---|---|---|---|
| 0235789 | 9/1987 | European Pat. Off. | |
| 1106351 | 12/1955 | France | 431/328 |
| 1917120 | 10/1969 | Germany | 431/328 |
| 2042364 | 6/1971 | Germany | |
| 2428622 | 1/1975 | Germany | 431/328 |
| 0155430 | 7/1987 | Japan | 431/329 |
| 1310217 | 12/1989 | Japan | 431/326 |
| 0036411 | 2/1991 | Japan | 431/326 |
| 1444673 | 8/1976 | United Kingdom | |
| 2098314 | 11/1982 | United Kingdom | |

Primary Examiner—Carl D. Price
Attorney, Agent, or Firm—Oblon, Spivak, McClelland, Maier, & Neustadt

[57] ABSTRACT

A low calorific gas is burned without the need of mixing or burning it with a high calorific gas. The method includes introducing either combustion air or low calorific gas into the mixing chamber, introducing the remainder into the mixing chamber through the perforated nozzles such that it is injected in the radial direction at a high speed from the holes to effect the mixing of the two in the mixing chamber, and injecting the mixed gas into the combustion chamber through the nozzles of the refractory baffle. The stable combustion of a low calorific gas alone by the aid of combustion air without the need of diffusing it into the atmosphere or burning it together with an expensive high calorific gas or oxygen-enriched combustion air is thereby effected, which greatly contributes to energy saving and environmental protection.

6 Claims, 3 Drawing Sheets

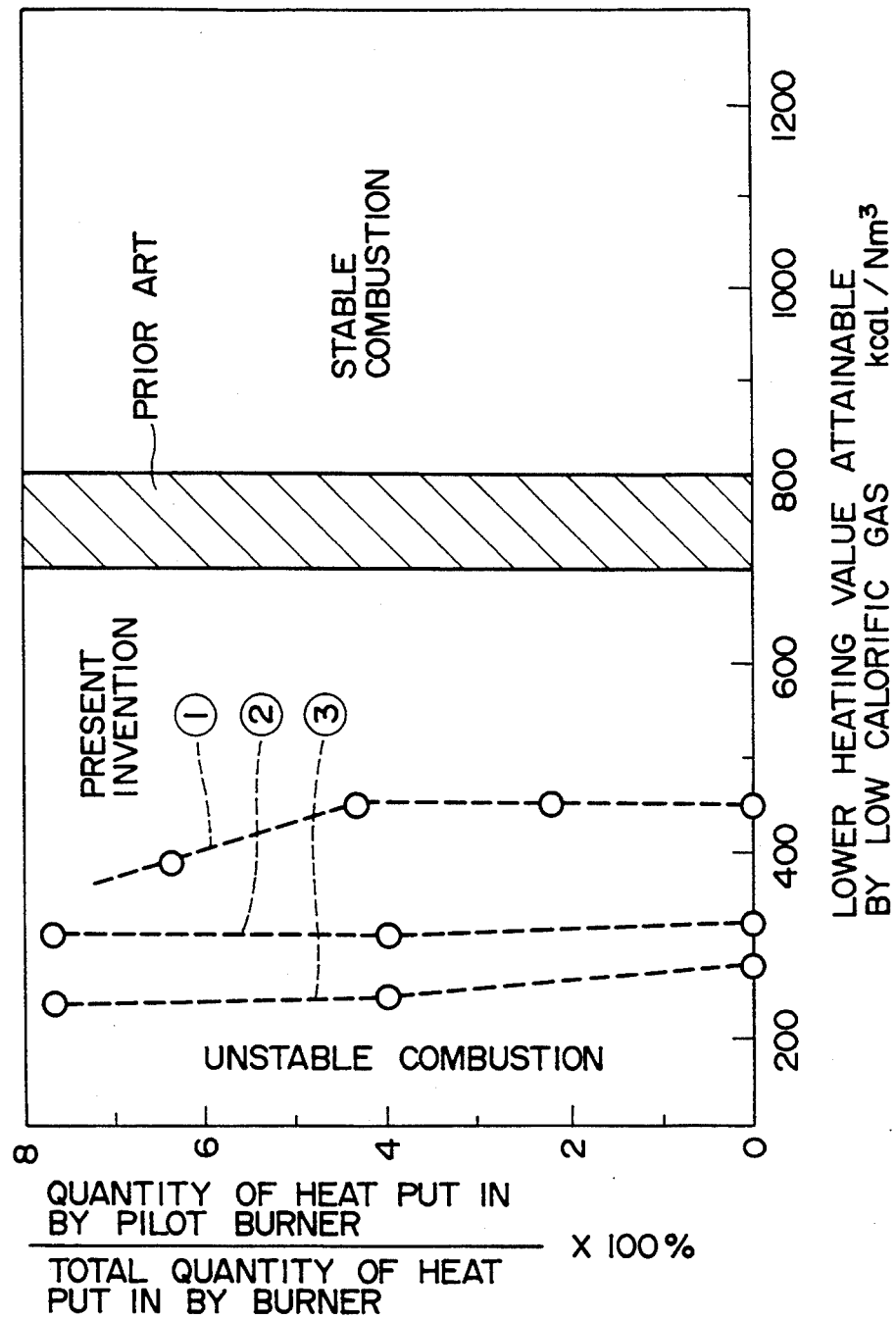

BURNER AND METHOD FOR BURNING LOW CALORIFIC GAS

This application is a continuation of application Ser. No. 07/946,585, filed on Sep. 18, 1992, now abandoned.

BACKGROUND OF THE INVENTION

1. Field of the Invention

The present invention relates to a burner and method for burning a low calorific gas and, more particularly, to a burner and method for burning a low calorific gas having a calorific value lower than about 800 kcal/Nm$^3$.

2. Description of the Prior Art

A variety of by-product gases come from petrochemical plants, petroleum refineries, and iron mills. Of these, high calorific ones are utilized as a heat source for heating furnaces and boilers but low calorific ones having a calorific value lower than 800 kcal/Nm$^3$ involve difficulties in combustion. In actual practice, with a calorific value lower than 600 kcal/Nm$^3$, they do not burn continuously because they cannot sustain the theoretical combustion temperature even when heated above their ignition point.

For this reason, the low calorific by-product gases are burned after mixing with a high calorific gas (such as butane, natural gas, and coke-oven gas), thereby increasing the calorific value to at least 800 kcal/Nm$^3$, or burned together with a high calorific gas, fuel oil, or kerosene, in spite of economical disadvantage. Alternatively, they are burned together with a high calorific gas in the atmosphere by means of a flare stack.

There is a method for burning a low calorific gas by means of a burner provided with a heat exchange function which utilizes the combustion gas for the fuel gas preheating. There is another method for burning a low calorific gas by the aid of oxygen-enriched combustion air.

There are three methods for burning a low calorific gas. The first one employs a burner having a heat exchange function for fuel gas preheating with combustion gas. The second one resorts to oxygen-enriched combustion air. The third one involves the mixing with a high calorific gas and the preheating of both or either of the combustion air and fuel gas (as in hot stoves for blast furnaces).

Burning a low calorific gas together with a high calorific gas (such as butane, natural gas, and coke-oven gas) or by the aid of oxygen-enriched combustion air is not only uneconomical but also undesirable for material and energy saving. Also, burning a low calorific gas by means of a burner having a heat exchange function needs a heat source for preheating and a complex structure for heat exchange.

In order to solve the above-mentioned problems, the present inventors had previously developed an apparatus for burning a low calorific gas and filed an application for patent. (See Japanese Patent Laid-open No. 306009/1990.)

Their subsequent investigation led to the development of a new burner and method for burning a low calorific gas without the need of mixing it with a high calorific gas.

SUMMARY OF THE INVENTION

The present invention is embodied in a burner for burning a low calorific gas which comprises a combustion chamber, a refractory baffle with a plurality of nozzles formed therein which is placed in the combustion chamber, and a mixing chamber in which there are a plurality of perforated nozzles, each having a plurality of holes in the wall thereof, said mixing chamber being at the up-stream side of the refractory baffle.

The present invention is also embodied in a method for burning a low calorific gas using a burner defined above, said method comprising introducing either combustion air or low calorific gas into the mixing chamber, introducing the remainder into the mixing chamber through the perforated nozzles such that it is injected in the radial direction at a high speed from the holes to effect the mixing of the two in the mixing chamber, and injecting the mixed gas into the combustion chamber through the nozzles of the refractory baffle.

BRIEF DESCRIPTION OF THE DRAWINGS

FIG. 1b is a sectional view taken along the line X—X of FIG. 1a.

FIG. 4 is a graph showing the region of the lower heating value attainable by a low calorific gas, with the abscissa representing the lower heating value, the ordinate representing the ratio of the quantity of heat put in by the pilot burner to the total quantity of heat put in by the burner.

DESCRIPTION OF THE PREFERRED EMBODIMENTS

The invention will be described in more detail with reference to the following examples.

Figure 1A:
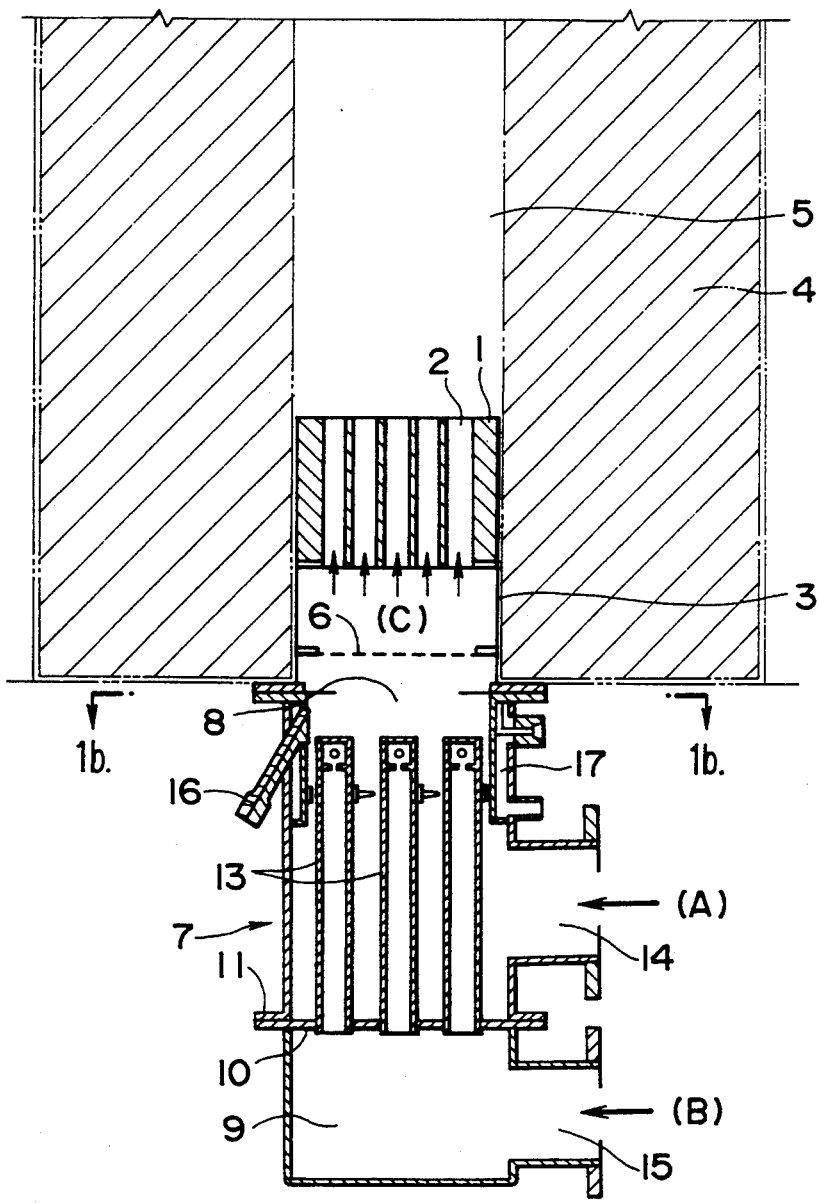
FIG. 1a is a sectional view of the burner pertaining to the present invention.
Figure 1B:
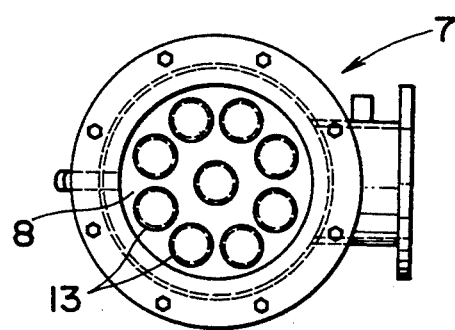
Figure 2:
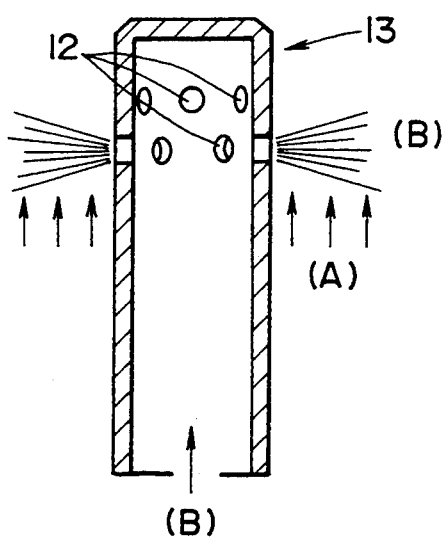
FIG. 2 is a schematic enlarged sectional view of the perforated nozzle pertaining to the present invention.

The burner pertaining to the present invention is shown in FIG. 1a (which is a sectional view) and FIG. 1b (which is a sectional view taken along the line X—X of FIG. 1a).

Referring to FIG. 1, there is shown a refractory baffle 1 with a plurality of nozzles 2 formed therein. It is supported by a metal cylinder 3 and is placed in a combustion cylinder 5 formed in a furnace wall 4 of a combustion furnace. The metal cylinder 3 is provided with a flame arrester 6.

Also referring to FIG. 1, there is shown a cylindrical burner proper 7, which is made up of a mixing chamber 8 and a feeding chamber 9. The end of the mixing chamber 8 is joined to the metal cylinder 3 and fixed to the outer surface of the furnace wall 4 of the combustion furnace. Between the mixing chamber 8 and the feeding chamber 9 is a partition 10 which is larger in diameter than the burner proper 7. The partition 10 is fixed to the upper end of the feeding chamber 9 and bolted to the flange 11 of the mixing chamber. The partition is provided with 9 perforated nozzles 13, each having a plurality of holes 12 formed in the wall of the forward end thereof. The mixing chamber 8 has an inlet 14 and the feeding chamber has an inlet 15. Incidentally, there is shown a thermocouple 16 to detect a backfire, and there is shown a water-cooled zone 17 (constituting a part of the mixing chamber 8) which makes a backfire harmless even if it should occur.

The burner constructed as mentioned above operates in the following manner for the combustion of a low calorific gas A with combustion air B.

In general, a low calorific gas A needs a less amount of combustion air than its volume for complete combustion. Therefore, it is desirable that combustion air B be injected at a high speed from the perforated nozzles 13. In other words, combustion air B (accounting for a smaller portion) should be pressurized and injected into the mixing chamber 8 filled with a low calorific gas A (accounting for a larger portion). This saves the electric power for pressurization and contributes to uniform mixing. Another advantage of injecting combustion air B from the perforated nozzles 13 is that-there is no possibility that holes are clogged with tar and other impurities contained in a low calorific gas (or by-product gas).

The injection of combustion air B is in the radial direction (i.e., transverse to the flow direction of the low calorific gas A) from holes 12 at the forward end of the perforated nozzle 13, as shown in FIG. 12. The injected combustion air B meets at right angles the flow of low calorific gas A introduced into the mixing chamber 8 through the inlet 14. Each perforated nozzle 13 has twelve holes 12 which are arranged zigzag in two tiers to promote microscopic mixing. The flow rate of combustion air B injected from the holes 12 should be greater than about 30 m/s for turbulent mixing with low calorific gas A.

The rapid mixing of combustion air B with low calorific gas A in the mixing chamber 8 gives rise to an ideally premixed gas C in which each molecule of low calorific gas A is uniformly surrounded by combustion air B. Then the premixed gas C is fed to the refractory baffle 1 through the flame arrester 6.

The refractory baffle 1 is made of a castable refractory, so that it withstands the high temperature and prevents the mixing chamber 8 from getting hot owing to its low thermal conductivity. What is important in the combustion of low calorific gas A is flame stability. This object is achieved by the refractory baffle 1 in the present invention, because it is constantly heated by radiant heat from the flame and the furnace wall 4. In addition, the large heat capacity of the refractory baffle 1 contributes to the stable combustion of low calorific gas A.

Figure 3A:
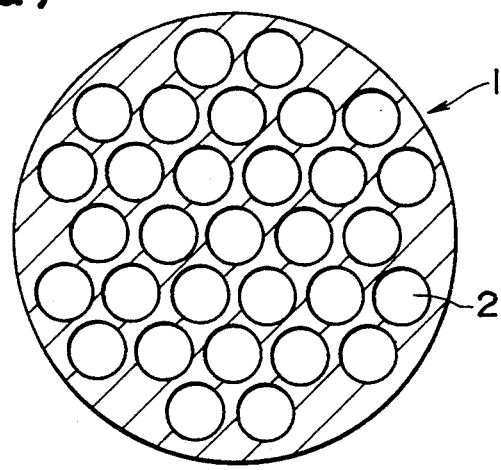
FIG. 3a is a top view of the refractory baffle pertaining to the present invention.
Figure 3B:
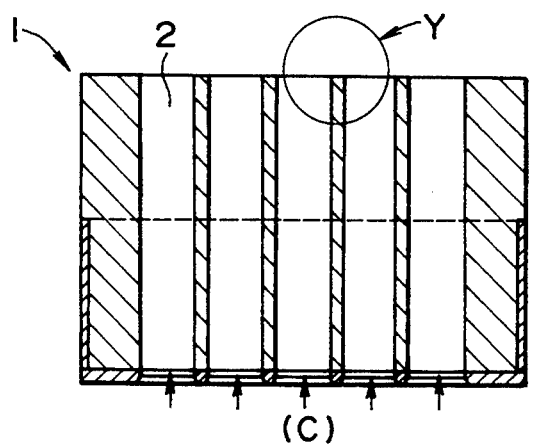
FIG. 3b is a sectional side elevation of the refractory baffle pertaining to the present invention.
Figure 3C:
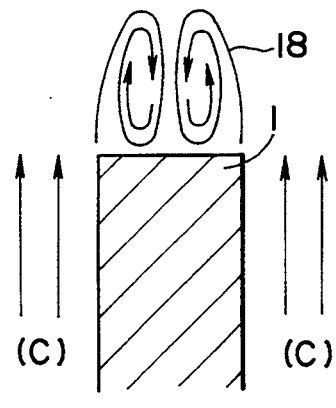
FIG. 3c is a schematic enlarged view of part Y in FIG. 3b.

The refractory baffle 1 permits the premixed gas C to flow through nozzles 2, as shown in FIG. 3. The flow of the premixed gas C produces a recirculation zone 18 on that part of the downstream side of the baffle 1 which is surrounded by the holes 2. It is in this recirculation zone 18 that low calorific gas A burns stably because the downstream side of the baffle 1 is heated to a high temperature by radiant heat from the flame and the furnace wall 4. This stable combustion functions as a flame stabilizer. This is equivalent to having a large number of pilot burners installed in the recirculation zones 18 of the refractory baffle 1. This is important because the premixed gas C is preheated as it passes through the nozzles 2 and hence is made to have a higher burning velocity which narrows the range of stable combustion. The flow rate of the premixed gas C in the nozzles 2 should preferably be low (say, 10-25 m/s) so long as no backfires occur.

The refractory baffle 1 should be constructed such that the solid part (where the recirculation zones 18 are formed) accounts for 40-60%, preferably 45-55%, of the area of its exit surface (downstream side). If this ratio is smaller than specified above, the combustion of low calorific gas A is impossible because the recirculation zones 18 do not fully function as the flame stabilizer. Conversely, if the ratio is greater than specified above, the flow rate of the premixed gas C in the nozzles 2 is so high that the blowoff of flames occurs which makes combustion unstable.

FIG. 4 is a graph showing the region of the lower heating value which is attained when a low calorific gas is burned according to the present invention and the prior art technology. It is noted that according to the prior art technology, it is only possible to burn a low calorific gas A having a lower heating value of about 700-800 kcal/Nm$^3$ even though the low calorific gas A and the combustion air B are both preheated to about 400° C. By contrast, according to the present invention, it is possible to burn an extremely low calorific gas having a lower heating value of about 250 kcal/Nm$^3$.

To be more specific, FIG. 4 shows the results of combustion which was carried out by preheating the low calorific gas A and the combustion air B at (1) 150° C., (2) 250° C., or (3) 330° C. Stable combustion was obtained in the area on the right side of the broken lines (1), (2), and (3); however, unstable combustion (with blowoff and flame vibration) occurred in the area on the left side of the broken lines (1), (2), and (3). It is also noted that the stable combustion zone is shifted leftward (decreasing in the heating value) as the preheating temperature is increased from (1) to (3). In the case of low preheating temperature (1), combustion is affected by the quantity of heat put in by the pilot burner; whereas in the case of high preheating temperature (2) or (3), combustion is affected only a little by the quantity of heat put in by the pilot burner, or combustion is so stable that the pilot burner is not necessary. This is because the flame in the recirculation zone 18 on the downstream side of the baffle 1 functions as the flame of the pilot burner, as mentioned above.

Effect of the Invention

The present invention permits the stable combustion of a low calorific gas alone by the aid of combustion air without the need of diffusing it into the atmosphere or burning it together with an expensive high calorific gas or oxygen-enriched combustion air. Therefore, the present invention greatly contributes to energy saving and environmental protection.

What is claimed is:

1. A method for burning a low calorific gas using a burner for burning a low calorific gas, said method comprising the steps of:
   introducing one of a combustion gas and a low calorific gas having a calorific value less than 800 kcal/Nm$^3$ into a mixing chamber of a burner, and without introducing any higher calorific gases having a calorific value greater than 800 kcal/Nm$^3$ into a mixing chamber of a burner,
   ejecting the other of the combustion gas and the low calorific gas into the mixing chamber through holes in perforated nozzles of the burner and in a direction substantially transverse to a direction of movement of the one of the gases in the mixing chamber to thereby mix the gases, injecting the mixed gases into a combustion chamber of the burner through nozzles of a refractory baffle in the burner, the combustion chamber having refractory walls and the nozzles of the refractory baffle being spaced to form recirculation zones at a downstream side of the refractory baffle, and stably burning the low calorific gas having a calorific value less than 800 kcal/Nm$^3$ in said recirculation zones, wherein said recirculation zones are heated by radiant heat from the flame of the burning low calorific gas and the refractory walls of the combustion chamber.

2. A method for burning a low calorific gas as defined in claim 1, wherein an injection speed of the ejected gas is greater than 30 m/s.

3. A method for burning a low calorific gas as defined in claim 1, wherein a flow rate of the premixed gas of low calorific gas and combustion gas is 10–25 m/s in the refractory baffle.

4. A method for burning a low calorific gas as defined in claim 1, wherein said injecting step comprises injecting the mixed gases through nozzles spaced such that a solid part of a downstream end of the refractory baffle accounts for 40–60% of the area of the downstream end.

5. A method for burning a low calorific gas as defined in claim 1, wherein the low calorific gas has a calorific value less than 600 kcal/Nm$^3$.

6. The method for burning a low calorific gas as defined in claim 5, in which the low calorific gas has a calorific value which is not sufficient to sustain the theoretical combustion temperature thereof.

* * * * *